(No Model.)
W. VENDER.
MANGER.
No. 489,349. Patented Jan. 3, 1893.
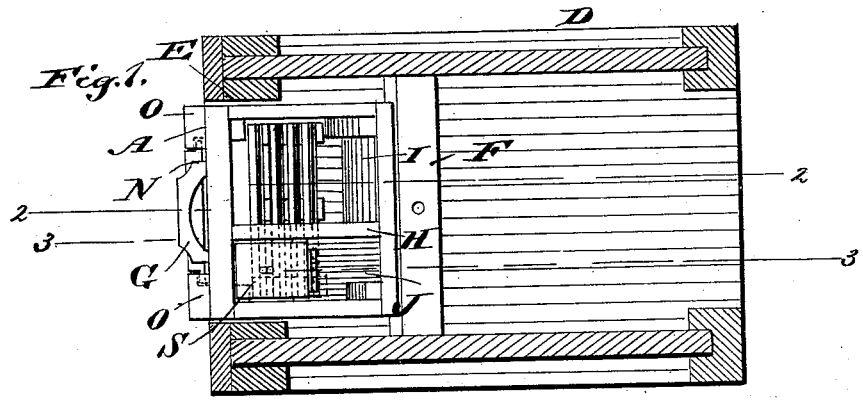
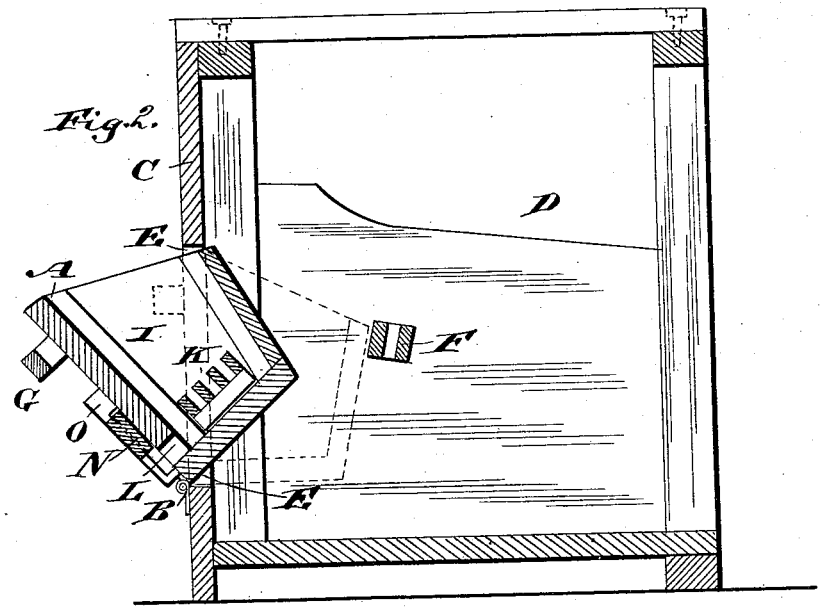
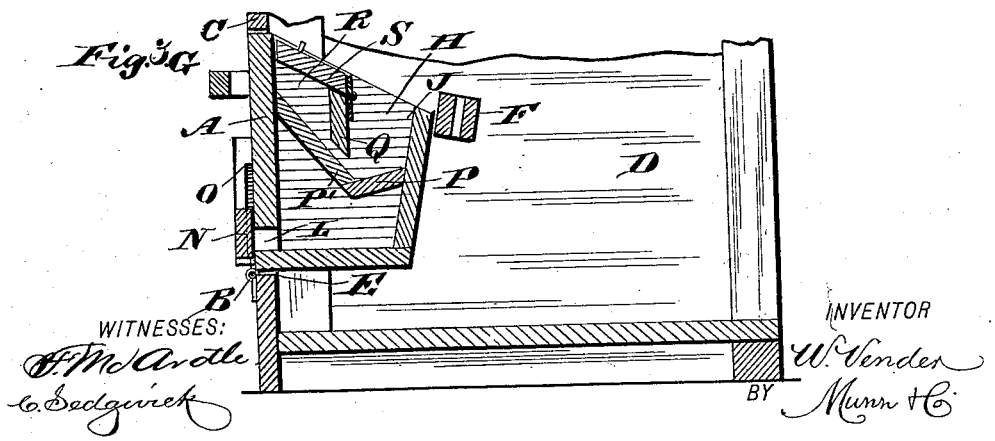
WITNESSES:
F. McArdle
C. Sedgwick
INVENTOR
W. Vender
BY Munn & Co.
ATTORNEYS.

UNITED STATES PATENT OFFICE.

WILLIAM VENDER, OF KINDE, MICHIGAN.

MANGER.

SPECIFICATION forming part of Letters Patent No. 489,349, dated January 3, 1893.

Application filed July 28, 1892. Serial No. 441,443. (No model.)

*To all whom it may concern:*

Be it known that I, WILLIAM VENDER, of Kinde, in the county of Huron and State of Michigan, have invented a new and Improved Manger, of which the following is a full, clear, and exact description.

The object of the invention is to provide a new and improved manger, which is simple and durable in construction, very effective in operation, and arranged to permit of feeding the hay separately from the oats and to conveniently fill the compartments of the manger without stepping into or entering the stall.

The invention consists of a hinged manger arranged in the front end of the stall and adapted to swing in and out of the latter and also adapted to be supported in the stall by a cross bar.

The invention also consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a plan view of the improvement as applied, the stall being shown in section; Fig. 2 is a sectional side elevation of the same on the line 2—2 of Fig. 1; and Fig. 3 is a similar view of the same on the line 3—3 of Fig. 1.

The improved manger is made in the shape of a box A hinged at its front lower edge by hinges B to the front end C of a stall D of any approved construction. The manger A passes through an opening E in the said front end C of the stall so that the manger can be swung inward, as shown in Figs. 1 and 3, for feeding the animal contained in the stall, or the manger can be swung outward into the position shown in Fig. 2, for filling the compartments of the manger with the necessary food. The manger A is supported when in its innermost position, by a cross bar F attached to the sides of the stall and to which the animal can be tethered. The manger A is provided with a transversely-extending partition H forming two compartments I and J, of which the compartment I is adapted to receive the hay or cut feed and the other is adapted to receive the oats or other grain. The manger is also provided at its front with a suitable handle G. In the bottom of the compartment I is preferably placed a grate K previous to introducing the hay so that the latter rests thereon and seed, sand or other small particles can fall through the hay through the grate K onto the bottom of the manger, so that the animal cannot reach the same, while feeding, and thus only obtains the pure hay. In order to discharge the impurities collecting in the bottom of the compartment I, the front of the same is provided with a slot L formed in the front of the manger and close to the bottom of the same. This opening is adapted to be closed while feeding cut feed, by a slide N mounted to slide on the front of the manger in suitable guideways O, as shown in the drawings. Now, when the manger is swung into an outermost position, as shown in Fig. 2, then the collected impurities can fall through the open slot L into the gangway adjacent to the stall.

When the cut feed is used, the slide N is closed and the grate K is removed from the compartment I. The grain compartment J is provided with a slightly inclined bottom P from which leads upwardly a second bottom P' forming with a transversely extending partition Q a compartment R in the rear of the feeding compartment J. This compartment R serves as a storage receptacle for the grain and is closed by a lid S hinged on the partition Q. The latter extends a short distance from the second bottom P' so as to form a slot for the passage of the grain from the compartment R to the feeding compartment J. Thus, the animal always receives but a small amount of grain within the compartment J, it being understood that additional grain is continuously fed from the storage compartment R as that amount of grain is eaten up by the animal contained in the compartment J.

It will be seen that this device is very simple and durable in construction, can be readily swung into position for placing the food into the several compartments without entering the stall and when the manger is filled with the food it can be swung into the stall to bring the food within convenient reach of the animal in the manner described.

Having thus fully described my invention, I claim as new and desire to secure by Letters Patent,—

1. The combination with the manger hinged at its lower forward edge to swing outwardly and provided in its lower front wall at the hinged edge with a slot, of a closure for the slot, and a removable grate resting on the bottom of the manger; whereby when the closure is moved from over the slot and the manger swung outwardly, the refuse in the bottom of the manger will be discharged, substantially as set forth.

2. A manger provided with a transverse partition dividing it into two compartments I J, a slot L being formed in the forward wall of the compartment I, a slide N therefor, a removable grating in the bottom of the compartment I, and the grain receptacle within the compartment J and having a slot Q to discharge its contents into said compartment, and a lid for said receptacle, substantially as set forth.

3. The combination with a stall having an opening through its front wall and a tethering cross-bar F near its front wall in line with the opening, of the manger A hinged at its outer lower edge to the bottom wall of the opening to swing outwardly and inwardly therethrough and rest against the cross bar, a partition dividing the manger into two compartments, a removable grating on the bottom of one compartment, a slot in the front wall of said compartment and provided with a slide, the second compartment being provided with a covered receptacle having a slot to discharge its contents therein, substantially as set forth.

WILLIAM VENDER.

Witnesses:
RICHARD REDDAWAY,
LEONARD R. THOMAS.